(12) United States Patent
Yoshino et al.

(10) Patent No.: US 9,919,557 B2
(45) Date of Patent: Mar. 20, 2018

(54) OMNI-WHEEL, FRICTIONAL PROPULSION DEVICE AND OMNI-DIRECTIONAL VEHICLE

(71) Applicant: HONDA MOTOR CO., LTD., Minato-Ku, Tokyo (JP)

(72) Inventors: Tsutomu Yoshino, Wako (JP); Wataru Yada, Wako (JP); Shoei Abe, Wako (JP); Shigeo Kobayashi, Wako (JP); Ken Oizumi, Wako (JP); Tsuyoshi Yadori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 15/096,762

(22) Filed: Apr. 12, 2016

(65) Prior Publication Data

US 2016/0303898 A1    Oct. 20, 2016

(30) Foreign Application Priority Data

Apr. 16, 2015    (JP) ................................. 2015-084149

(51) Int. Cl.
| | |
|---|---|
| *B60B 19/00* | (2006.01) |
| *B62K 1/00* | (2006.01) |
| *B60B 19/12* | (2006.01) |
| *B62M 7/10* | (2006.01) |
| *B62M 13/00* | (2010.01) |
| *B62K 11/00* | (2006.01) |

(52) U.S. Cl.
CPC ............ *B60B 19/003* (2013.01); *B60B 19/12* (2013.01); *B62K 1/00* (2013.01); *B62K 11/007* (2016.11); *B62M 7/10* (2013.01); *B62M 13/00* (2013.01)

(58) Field of Classification Search
CPC ...... B60B 19/003; B60B 19/12; B60B 12/125
See application file for complete search history.

(56) References Cited

U.S. PATENT DOCUMENTS

| | | | |
|---|---|---|---|
| 8,499,864 B2 * | 8/2013 | Takenaka | B60B 19/003 180/10 |
| 8,827,375 B2 | 9/2014 | Takenaka et al. | |
| 2010/0096905 A1* | 4/2010 | Takenaka | B60B 19/00 301/5.23 |

FOREIGN PATENT DOCUMENTS

| | | |
|---|---|---|
| JP | 2010-247640 A | 11/2010 |
| WO | 2010/064408 A1 | 6/2010 |

\* cited by examiner

*Primary Examiner* — Kevin Hurley
(74) *Attorney, Agent, or Firm* — Carter Blackman & Associates, P.C.; Joseph P. Carrier; Jingli Wang (57) ABSTRACT

Provided is an omni-wheel including an annular core member for rotatively supporting a plurality of free roller that is light, economical and strong. The omni-wheel comprises an annular core member having at least one junction defined by mutually circumferentially opposing ends thereof, a plurality of sleeve members defining an inner bore and passed onto the core member and a free roller rotatably supported on an outer surface of each sleeve member in a coaxial relationship, wherein the mutually opposing ends of the annular core member at each junction are fitted into either end of the inner bore of the corresponding sleeve member.

9 Claims, 10 Drawing Sheets

OMNI-WHEEL, FRICTIONAL PROPULSION DEVICE AND OMNI-DIRECTIONAL VEHICLE

TECHNICAL FIELD

The present invention relates to an omni-wheel, a frictional propulsion device and an omni-directional vehicle.

BACKGROUND ART

As a wheel that can be used in omni-directional propulsion systems such as vehicles, transporters and robots, it is known to fit a plurality of free rollers on an annular core member such that each free roller may be freely rotatable around the tangential direction of the annular core member at the corresponding position. See JP2010-247640A and WO2010/64408A, for instance. Such a wheel is known as an omni-wheel, and allows the vehicle fitted with such a wheel to travel not only in the fore and aft direction owing to the rotation of the annular core member around the center line thereof but also in the lateral direction owing to the rotation of the individual free rollers fitted on the annular core member around the respective tangential lines. By combining these two traveling modes, the vehicle is allowed to travel in any oblique direction as desired.

The annular core members of conventional omni-wheels were known to be costly and heavy because they were made by machining or casting metallic members. Also, to allow the free rollers to be fitted on the annular core member, the annular core member has to be made of two pieces or two halves which are joined to each other once all the free rollers are in place. Various proposals have been made for joining the two pieces together, but have suffered from the problems of high complexity and high cost. Furthermore, in order to ensure the necessary mechanical strength, the annular core member is required to have a significant thickness, and hence a significant weight.

Therefore, there is a need for a light, economical and strong annular core member that can be advantageously used for building an omni-wheel.

BRIEF SUMMARY OF THE INVENTION

In view of such problems of the prior art, a primary object of the present invention is to provide an omni-wheel including an annular core member for rotatively supporting a plurality of free rollers that is light, economical and strong.

A second object of the present invention is to provide a frictional propulsion device and an omni-directional vehicle equipped with such an omni-wheel.

To achieve such objects, the present invention provides an omni-wheel, comprising: an annular core member (32) having at least one junction (A) defined by mutually circumferentially opposing ends (35) thereof; a plurality of sleeve members (36) defining an inner bore (38) and passed onto the core member; and a free roller (60) rotatably supported on an outer surface of each sleeve member in a coaxial relationship; wherein the mutually opposing ends of the annular core member at the at least one junction are fitted into either end of the inner bore of the corresponding common sleeve member.

The junction of the annular core member is formed by fitting the opposing ends of the annular core member into the respective ends of the inner bore of the corresponding common sleeve member so that a highly secure and stiff connection can be made between the opposing ends of the annular core member.

According to a preferred embodiment of the present invention, the sleeve members are identically shaped to one another. Thereby, no special coupling member is required for joining the two opposing ends of the core member at the junction because the sleeve member that is located at the junction serves as the member for joining the two opposing ends of the core member.

According to a particularly preferred embodiment of the present invention, the sleeve members each include a cylindrical part supporting the corresponding free roller and a pair of semi-cylindrical parts extending from either end of the cylindrical part, the two semi-cylindrical parts being in an angularly offset relationship by 180 degrees about a central axial line thereof so that the two semi-cylindrical parts of each pair of adjoining sleeve members interlock with each other.

Because the cylindrical part of each sleeve member supporting the free roller is provided in the middle part of the sleeve member, the load of the free roller can be evenly transmitted to the core member via the sleeve member so that the mechanical strength of the wheel is enhanced. Furthermore, the interlocking relationship between each adjoining pair of the sleeve members prevents any relatively movement between the adjoining sleeve members.

Preferably, the sleeve members are each secured to the core member at the semi-cylindrical parts thereof by using fasteners. Thereby, the assembling work of the wheel is simplified. The fasteners may be configured to be accessible from the axial direction or radially outer direction so that the assembly work may be particularly simplified.

According to a certain aspect of the present invention, the omni-wheel further comprises a spacer interposed between each adjoining pair of free rollers, the spacer being retained to the corresponding mutually interlocking parts of the semi-cylindrical parts by a spring member having an intermediate part engaging the spacer and a pair of leg parts extending from either lateral end of the intermediate part and resiliently retained in engagement features provided in the semi-cylindrical parts, respectively, at free ends thereof.

The spacer prevents intrusion of foreign matters into the gap between the adjoining free rollers. By using a spring member that can be snap fitted into or onto the engagement features such as recesses provided in the semi-cylindrical parts, the attachment and detachment of the spacer can be facilitated.

Typically, the core member comprises a metallic pipe member, and comprises a pair of semi-circular halves joined into a fully circular configuration at a pair of junctions.

Thereby, the assembling of the sleeve members and the free rollers to the core member can be easily performed before joining the semi-circular halves into a fully circular configuration.

The present invention further provides a frictional propulsion device, comprising: a pair of drive disks rotatably supported by a unit frame about a common rotational center line opposite to each other, each drive disk including a plurality of free rollers each rotatably supported thereon about a rotational center line extending obliquely with respect to both a tangential line and the rotational center line of the drive disk; and the omni-wheel configured as discussed above positioned between the drive disks, at least part of the free rollers of the omni-wheel being engaged by the corresponding free rollers of the drive disks.

According to this arrangement, the rotation of the drive disks is transmitted to the omni-wheel via the engagement between the drive rollers and the free rollers.

The prevent invention also provides an omni-directional vehicle, preferably consisting of an inverted pendulum vehicle, comprising: the frictional propulsion device that has been mentioned above; and a drive unit supported by the unit frame and configured to rotationally drive the two drive disks individually.

According to the omni-wheel of the present invention, the manufacturing cost can be reduced owing to the simple structure thereof, and an adequate mechanical strength and stiffness can be ensured without increasing the dimensions or the weight of the core member.

DESCRIPTION OF THE PREFERRED EMBODIMENT(S)

A preferred embodiment of the present invention is described in the following with reference to FIGS. 1 to 9.

Figure 1:
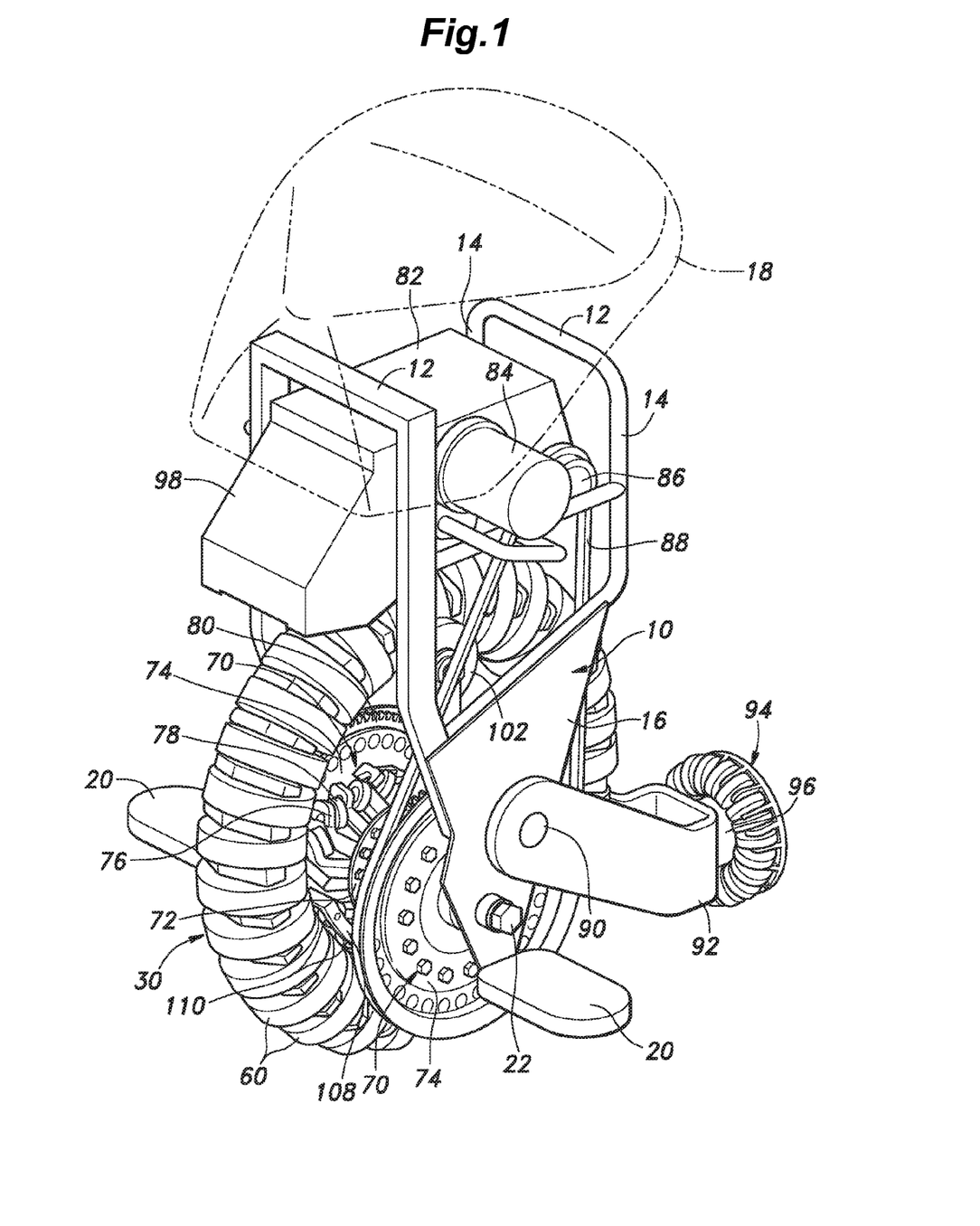
FIG. 1 is a perspective view of an omni-directional vehicle of an inverted pendulum type using an omni-wheel and a frictional propulsion device according to the present invention.

As shown in FIG. 1, the inverted pendulum vehicle of the illustrated embodiment (omni-directional vehicle) comprises a vehicle body frame 10. The vehicle body frame 10 comprises a pair of upper cross members 12, and a pair of side leg members 14 each having a pair of bifurcated upper parts connected to the lateral ends of the corresponding cross members 12, respectively, and a lower part connected to a triangular lower support plate 16 extending along either side of the vehicle. The upper cross members 12 support a saddle 18 for seating the rider, and each lower support plate 16 is fitted with a foot rest 20 for supporting the corresponding foot of the rider.

A main wheel 30 and a pair of drive disks 70 flanking the main wheel 30 are disposed between the lower parts of the two leg members 14 or the lower support plates 16. The two drive disks 70 are symmetric to each other about the central major plane of the main wheel 30, and are each provided with a hub 72, a disk member 74 connected coaxially and outboard to the hub 72 and a holder assembly 76 provided on the periphery of the hub 72 to rotatably support a plurality of drive rollers (free rollers) 60 as will be described hereinafter. Each drive disk 70 is rotatably supported by the corresponding lower support plate 16 via a support shaft 22 extending laterally. Thus, the two drive disks 70 are supported by the body frame 10 via the common support shaft 22 in an individually rotatable manner.

Each holder assembly 76 supports a plurality of drive rollers (free rollers) 78 along the outer periphery of the hub 72 in an individually rotatable manner each about a rotational center line extending obliquely with respect to both the tangential line and the rotational center line of the hub 72. The main wheel 30 comprises a plurality of driven rollers (free rollers) 60 arranged around an annular rotational center defined by a core member (which will be described hereinafter) in a rotatable manner like beads of a rosary, and is provided with a generally annular configuration. Each drive disk 70 engages the main wheel 30 or, more specifically, the drive rollers 78 of the drive disk 70 engage the driven rollers 60 of the main wheel 30. In this embodiment, only those drive rollers 78 located in a lower part of each drive disk 70 engage the driven rollers 60 located in a lower part of the main wheel 30.

The drive rollers 78 engaging the driven rollers 60 of the main wheel 30 are urged downward or against the driven rollers 60 under the weight of the vehicle and the rider seated on the saddle 18.

An hourglass shaped idler roller 102 having a laterally extending axial center line is rotatably supported by the body frame 10, and is passed through the hollow center of the main wheel 30 so that the narrow part of the idler roller 102 engages the upper part of the inner periphery of the main wheel 30. Thereby, the main wheel 30 is restrained against a roll movement thereof or prevented from tilting sideways.

Furthermore, when the body frame 10 is lifted off the ground, the idler roller 102 prevents the main wheel 30 from sagging down from the body frame 10.

Additionally, four guide roller assemblies 128 are provided on either side of the main wheel 30, one pair in the front and another pair in the back. Each guide roller assembly 128 is provided with three free rollers 110 arranged in tandem on an individual support member 108, each free roller 110 having a rotational center line extending axially with respect to the main wheel 30 with a slight slanting in the radial direction. The support members 108 of the four guide roller assemblies 128 are integrally connected to one another, and are jointly pivotally supported by the support shaft 22 (although not shown in the drawings). By engaging the front and rear parts of the main wheel 30, the guide roller assemblies 128 thus prevent not only the fore and aft movement of the main wheel 30 but also the yaw movement of the main wheel 30 relative to the body frame 10.

Thus, the main wheel 30 is kept in an upright posture and fixed in position relative to the body frame 10 by the cooperation of the drive disks 70, the idler roller 102 and the guide roller assemblies 128 with the central axial line of the main wheel 30 extending laterally (horizontally).

A driven pulley 80 is coaxially attached to the inner side of each disk member 74. The driven pulley 80 in this case consists of a toothed pulley, but may also consist of a regular V-pulley, flat pulley or a sprocket wheel. A gear box 82 is mounted in an upper part of the body frame 10, and a pair of electric motors 84 (only one of them is visible in FIG. 1) are attached to either side wall of the gear box 82 with the output shaft of each electric motor 84 extending in the inboard direction. The gear box 82 accommodates a reduction gear unit (not shown in the drawings) therein, and a pair of output shafts extend from either side of the gear box 82 in the outboard direction behind the electric motors 84, and each output shaft is fitted with a drive pulley 86. The rotation of each electric motor 84 is reduced in speed by the reduction gear unit, and is transmitted to the corresponding drive pulley 86. An endless cogged belt 88 is passed around each drive pulley 86 and the corresponding driven pulley 80 in a torque transmitting relationship so that the two drive disks 70 may be individually rotatively actuated by the respective electric motors 84. The electric motors 84 constitute a drive unit of an omni-directional vehicle according to exemplary embodiment of the present invention.

A tail wheel arm 92 consisting of a bifurcated yoke member is pivotally supported by the lower support plates 16 at the bifurcated base ends via a pivot shaft 90 thereof extending laterally so that the tail wheel arm 92 may be tilted vertically about the base end thereof. The rear end or the free end of the tail wheel arm 92 supports a tail wheel 94 consisting of an omni wheel in a rotatable manner around a rotational center line extending in the fore and aft direction. An electric motor 96 is provided between the rear end of the tail wheel arm 92 and the tail wheel 94 to allow the tail wheel 94 to be selectively rotated about the rotational center line thereof. By thus actuating the electric motor 96, the vehicle may be steered in any desired direction. The tail wheel 94 includes a plurality of free rollers arranged around the periphery thereof, each free roller being rotatable around a rotational center line tangential to the periphery of the tail wheel 94 so that the tail wheel 94 may be dragged in the fore and aft direction substantially without any friction owing to the rotation of the individual free rollers engaging the road surface.

An electric box 98 accommodating electronic units such as an electronic control unit, a gyro sensor and motor drive unit is attached to the front end of the gear box 82. The electronic control unit controls the two electric motors 84 for the drive disks 70 to maintain the vehicle in an upright posture by executing a control process based on inverted pendulum control, in addition to executing the control process for the normal propulsion of the vehicle, and the electric motor 96 for the tail wheel 94 which is responsible for the turning movement of the vehicle. The body frame 10 supports a battery for powering the electric motors 84 and 96 and the electronic units although not shown in the drawings.

When the two electric motors 84 for the drive disks 70 are rotated in the same direction at a same speed, the vehicle travels in the fore and aft direction owing to the rotation of the main wheel 30 around the laterally extending rotational center line thereof. At such a time, the driven rollers 60 on the main wheel 30 remain stationary in regard to the rotation thereof around the respective tangential lines.

When the two electric motors 84 for the drive disks 70 are rotated at a different speed or in different directions, the vehicle travels in an oblique direction owing to the lateral component of the drive force created by the rotation of the driven rollers 60 on the main wheel 30 which is in turn caused by the engagement between the drive rollers 78 and the driven rollers 60. When the rotational speeds of the electric motors 84 are the same but in the opposite directions, the vehicle is enabled to travel in the lateral direction owing to the rotation of the driven rollers 60 while the main wheel 30 remains stationary in regards to the rotation about the lateral axial line thereof.

Thus, by suitably actuating the electric motors 84 for the drive disks 70, the vehicle is able to travel linearly in any desired direction.

When the tail wheel 94 is rotatively actuated by the electric motor 96, the vehicle is caused to turn around a vertical line passing through the road contact point of the main wheel 30. In other words, any desired yaw movement of the vehicle may be achieved by suitably actuating the electric motor 96 for the tail wheel 94. Thus, by combining the control of the movement of the main wheel 30 and the control of the movement of the tail wheel 94, the vehicle is able to change both the travel direction and the heading of the vehicle at will.

The details of the main wheel 30 are described in the following with reference to FIGS. 2 to 9.

Figure 2:
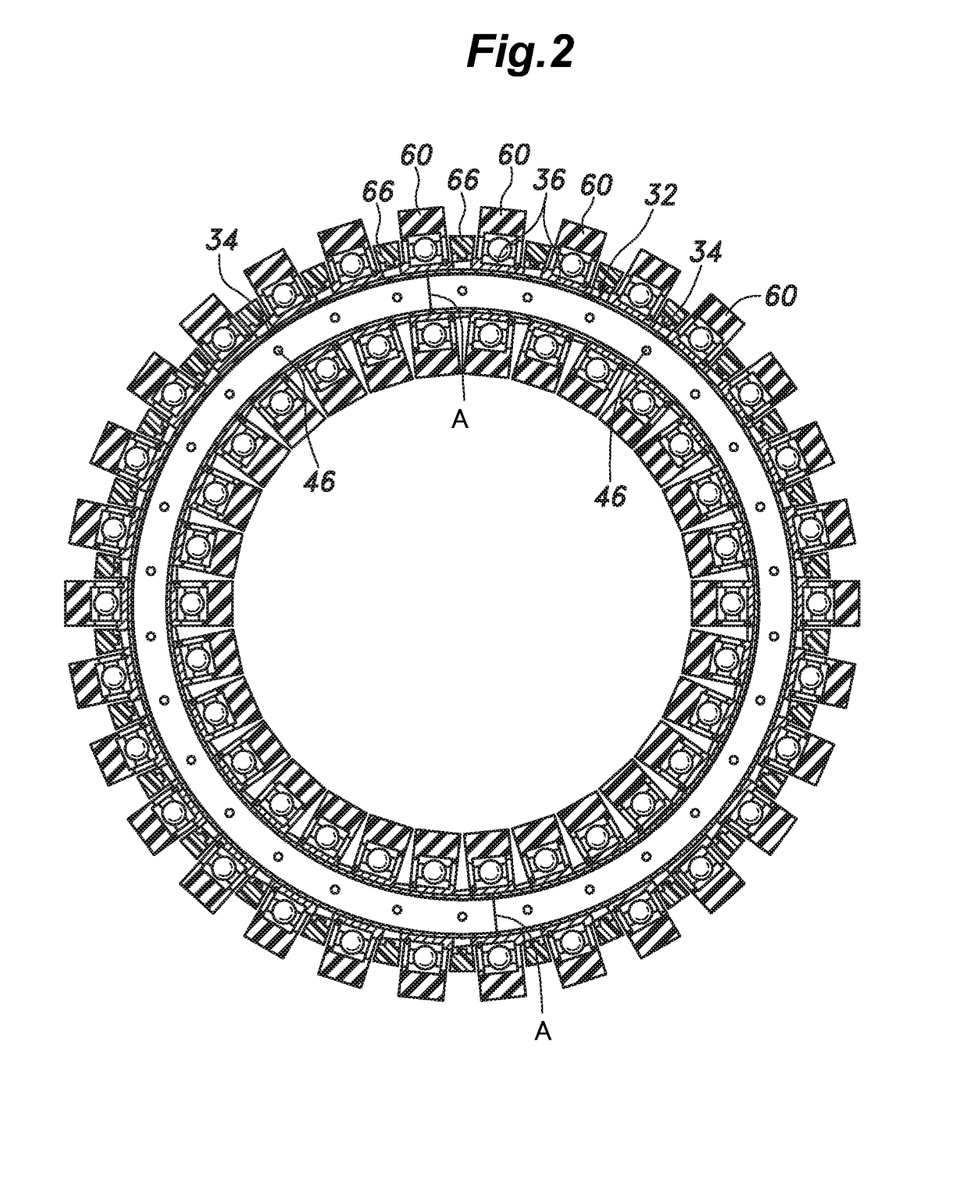
FIG. 2 is a sectional side view of the main wheel of the omni-directional vehicle.
Figure 3:
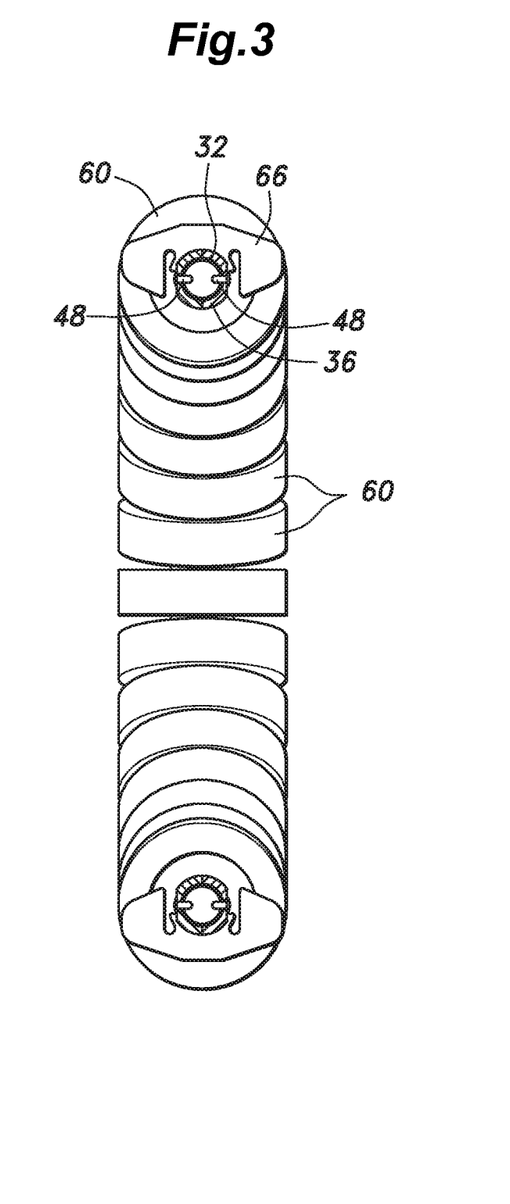
FIG. 3 is a vertical sectional view of the main wheel.
Figure 4:
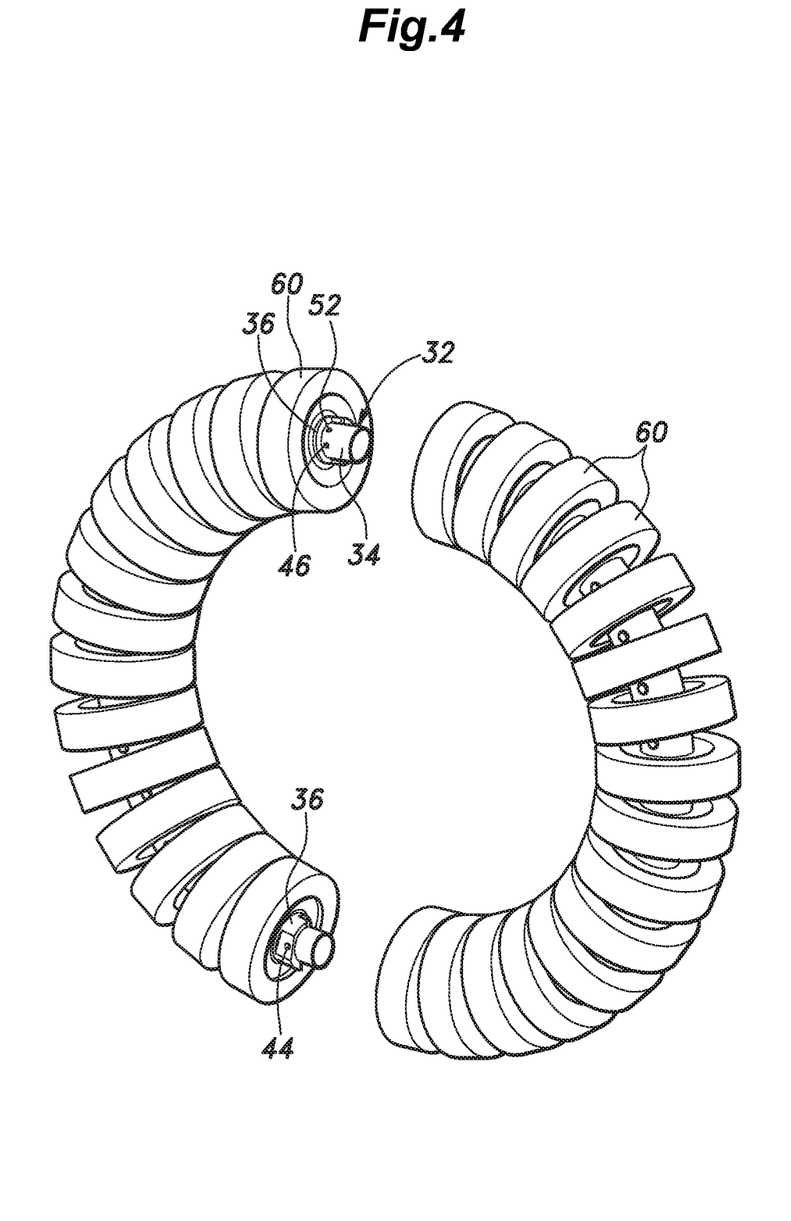
FIG. 4 is an exploded perspective view of the main wheel.
Figure 5A:
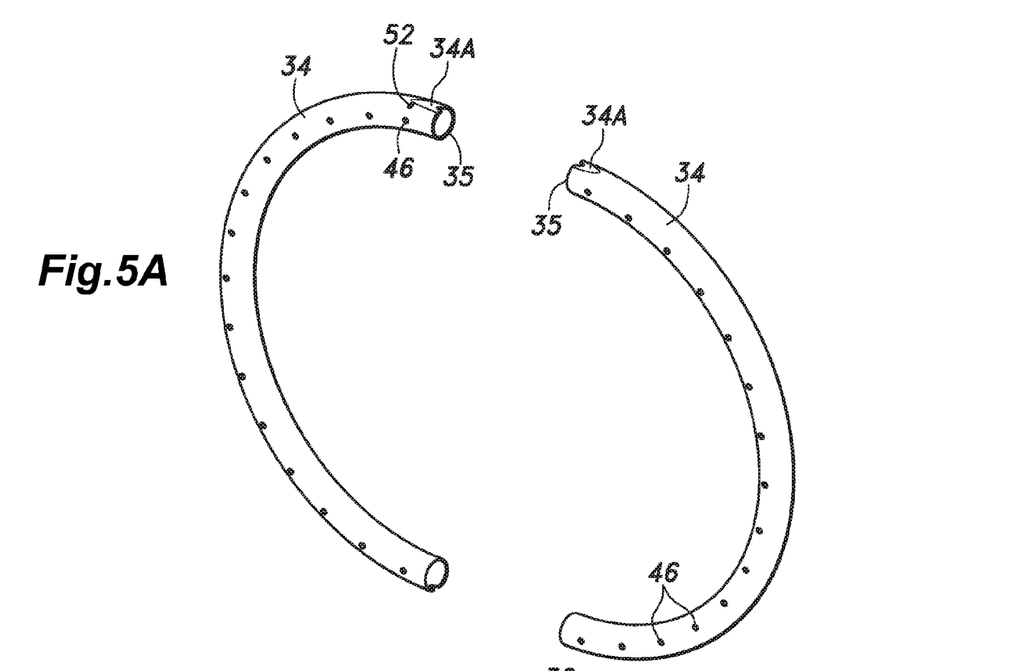
FIG. 5A is an exploded perspective view of the core member of the main wheel.
Figure 5B:
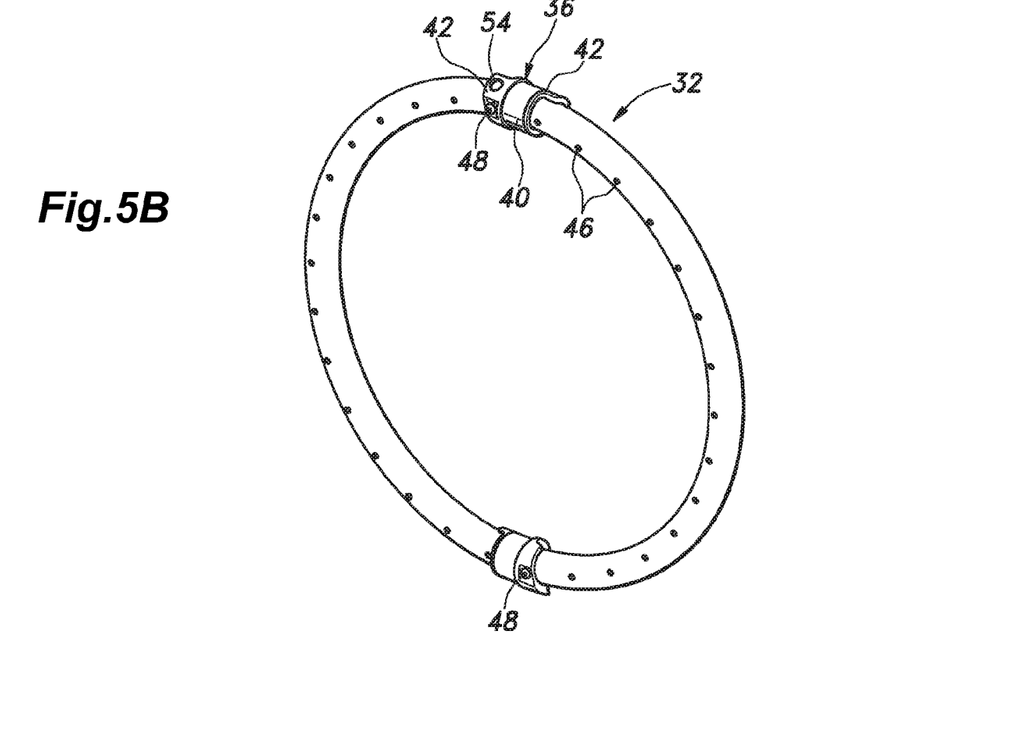
FIG. 5B is a perspective view showing the assembled state of the annular core member.

As best shown in FIGS. 2 to 4, the main wheel 30 comprises an annular core member 32 that is formed by joining two semicircular halves 34 (FIG. 5A) into a fully circular configuration (FIG. 5B). In particular, the opposing ends of the two halves 34 are made to abut each other at the circular end surfaces 35 thereof. A junction A is therefore defined between the two opposing ends of the two halves 34, and is joined to each other by using a sleeve member 36 as will be discussed hereinafter.

The two halves 34 may be formed by bending a metallic pipe made of such material as stainless steel (such as STKM: carbon steel tubes for machine structural purposes) and aluminum.

Figure 6:
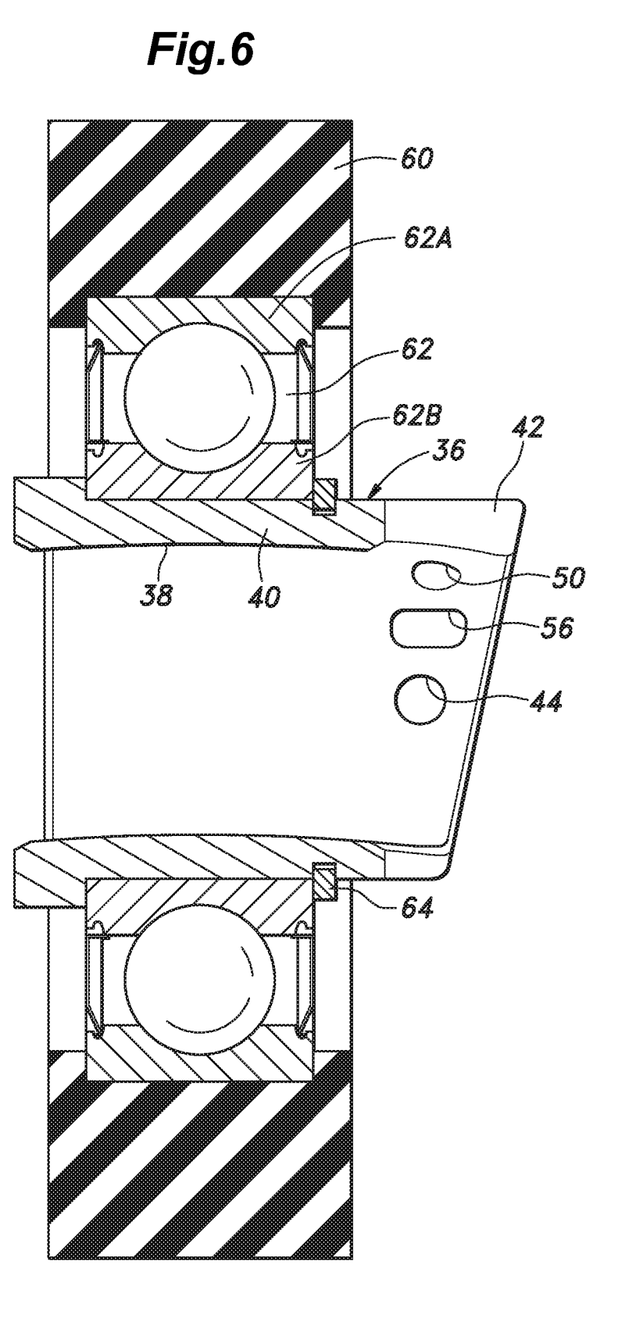
FIG. 6 is an enlarged sectional view of the inner sleeve and the free roller used in the main wheel.
Figure 7:
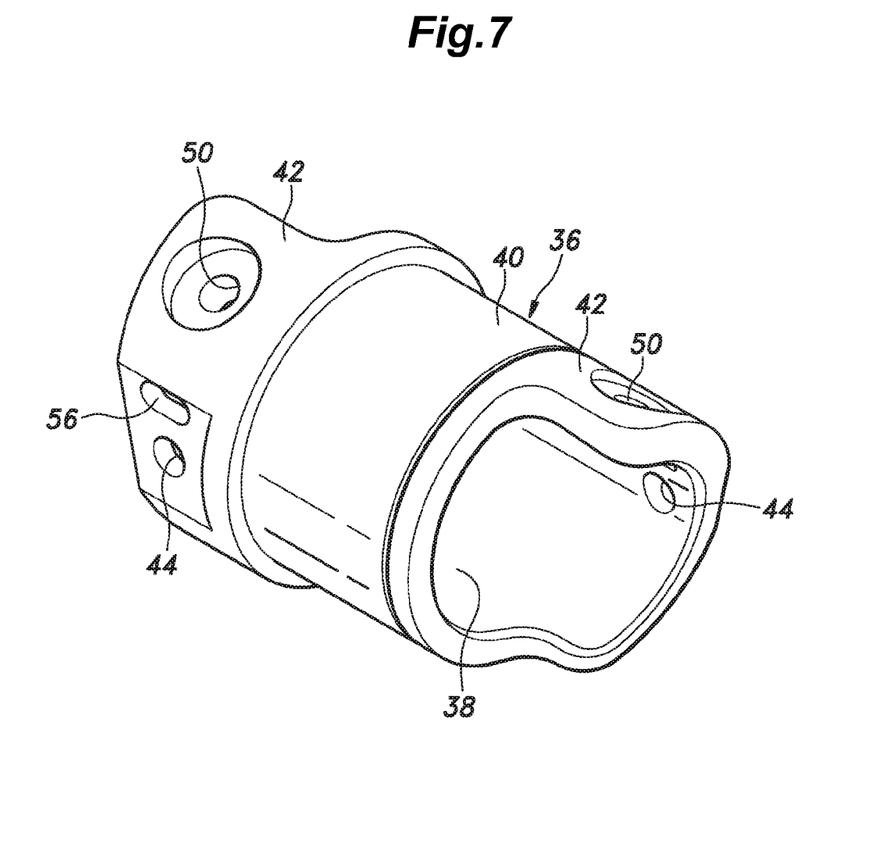
FIG. 7 is a perspective view of the inner sleeve.
Figure 8:
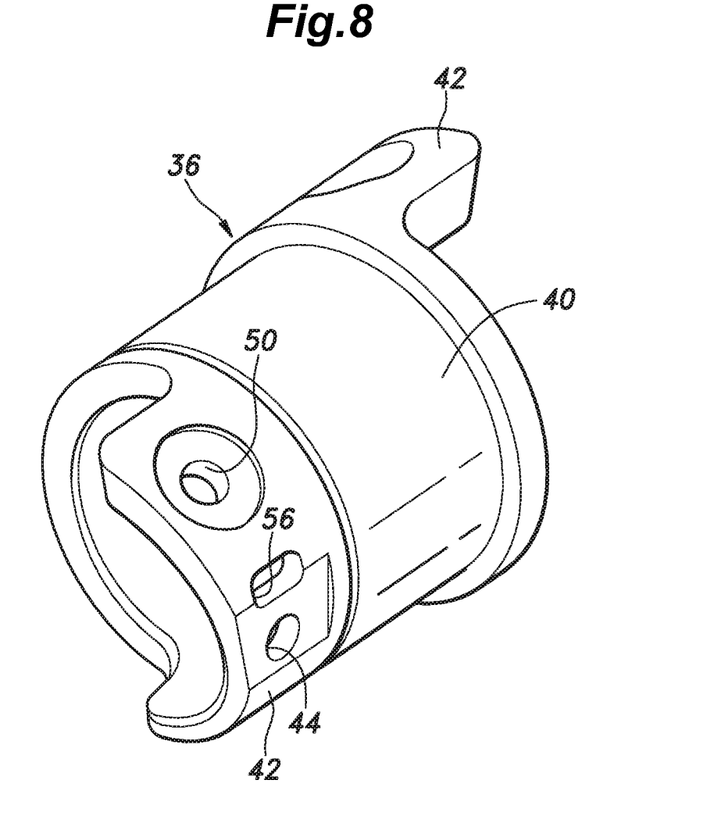
FIG. 8 is a perspective view of the inner sleeve as seen from the opposite direction.

A plurality of sleeve members 36 are fitted onto the core member 32 so that the axial ends of the sleeve members 36 abut one another. Each sleeve member 36 may be made by milling, casting or forging metallic material such as aluminum, or may be made of plastic material. For instance, the sleeve member 36 may be made by milling a pipe member cut into a prescribed length. As shown in FIGS. 6 to 8, the sleeve member 36 internally defines a hollow cylindrical bore 38 having a same inner diameter as the outer diameter of the two halves 34 and configured to closely receive the outer profile of the core member 32 by being curved at a same curvature as the core member 32. In particular, each sleeve member 36 comprises a cylindrical part 40 and a pair of semi-cylindrical parts 42 formed on either axial end of the cylindrical part 40. The two semi-cylindrical parts 42 are angularly offset (about the tangential line) relatively to each other by 180 degrees.

Each driven roller 60 is formed by vulcanizing rubber on the outer periphery of an outer race 62A of a radial ball bearing 62, and the inner race 62B of the ball bearing 62 is fitted on the cylindrical part 40 of the sleeve member 36. To facilitate the process of fitting each driven roller 60 onto the corresponding sleeve member 36, one of the semi-cylindrical parts 42 is provided with a slightly greater outer diameter than the cylindrical part 40 so that an annular shoulder surface is defined between the two parts. When fitting the ball bearing 62 onto the cylindrical part 40, this shoulder surface may provide an abutting surface for the inner race 62B of the ball bearing 62. Thus, by using a snap ring 64 to keep the inner race 62B engaged by the annular shoulder surface, the axial movement of the ball bearing 62 can be positively prevented. The other semi-cylindrical parts 42 is provided with a slightly smaller outer diameter than the cylindrical part 40 so that the ball bearing 62 of the driven roller 60 can be fitted onto the cylindrical part 40 of the sleeve member 36 without any difficulty.

Before connecting the two ends of the two halves 34 to each other, a prescribed number of the sleeve members 36 each fitted with the corresponding driven roller 60 on the cylindrical part 40 thereof are slid onto each half 34 from either terminal end of thereof.

The mutually opposing semi-cylindrical parts 42 of the adjoining sleeve members 36 are complementary to each other so as to form a fully cylindrical configuration jointly with each other. At each of the junctions between the two halves 34, the two opposing ends of the two halves 34 abut each other at a middle point of the cylindrical part 40 of the corresponding common sleeve member 34. In other words, the opposing ends the two halves 34 are fitted into the respective ends of the cylindrical bore 38. Thus, the sleeve members 36 are arranged circumferentially substantially without any gap on the core member 32.

As shown in FIG. 5A, a small cut 34A is made on the radially outer side of each end part of the two halves 34 to facilitate the fitting of each end part into the opposing end of the inner bore 38 of the corresponding sleeve member 36.

Figure 9:
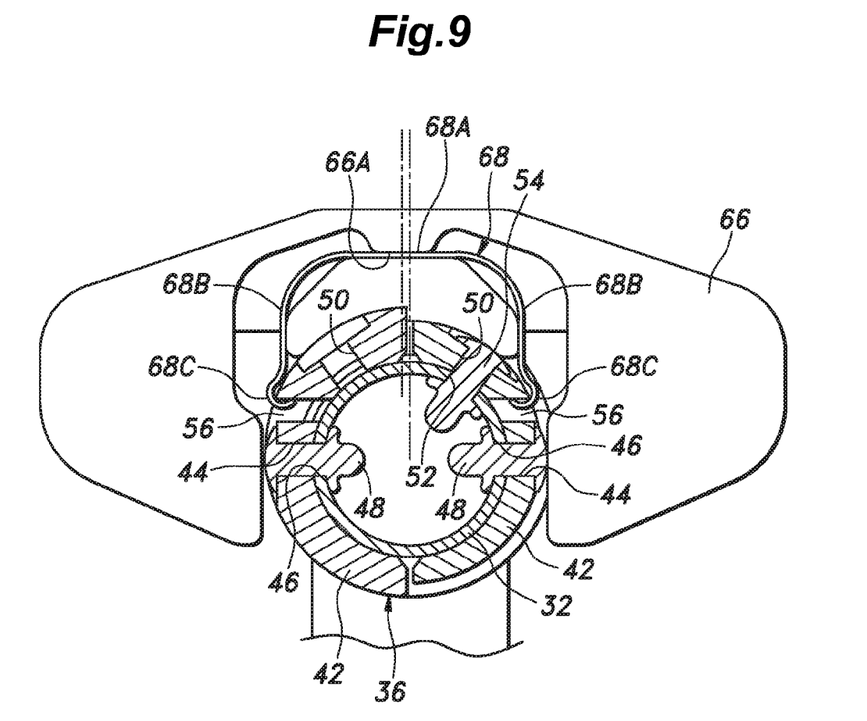
FIG. 9 is an enlarged sectional view of a part of the main wheel where the spacer is located.

Each sleeve member 36 is formed with a rivet hole 44 in each semi-cylindrical part 42 thereof, and the core member 32 is formed with rivet holes 46 corresponding to those formed in the sleeve members 36. In the illustrated embodiment, the rivet holes 46 of the core member 32 are formed in two rows on either axial side thereof. A blind rivet 48 is passed into each rivet hole 44 of the sleeve members 36 and the corresponding rivet hole 46 of the core member 32 to join the two associated parts as shown in FIG. 9.

Because the rivet holes 44 and 46 are directed axially or in parallel with the central axial line of the core member 32, the fastening of the blind rivets 48 is facilitated without being hindered by the driven rollers 60.

Each sleeve member 36 is formed with another rivet hole 50 in each semi-cylindrical part 42 thereof at a certain angular offset relative to the adjoining rivet hole 44. A corresponding rivet hole 52 is formed in each end part of the halves 34. These additional rivet holes 50 and 52 are used for firmly securing the sleeve members 36 located on the junctions A of the core member 32.

In regards to each of the sleeve members 36 located on the junctions A of the core member 32, a blind rivet 54 is passed into the rivet hole 50 and the corresponding rivet hole 52 of the core member 32, and fastens the sleeve member 36 to the core member 32. Thus, the semi-cylindrical part 42 of each of the sleeve members 36 located on the junction A between the two halves 34 is fastened to the corresponding half 34 at a pair of radially displaced positions so that a particularly strong securing force is provided by this sleeve member 36 that serves as a coupling member for joining the two halves 34.

In this case also, because the rivet holes 50 and 52 are directed radially outwardly at an angle or outwardly tilted with respect to the central axial line of the core member 32, the fastening of the blind rivets 54 is facilitated without being hindered by the driven rollers 60.

As shown in FIGS. 2 and 3, a wedge shaped spacer 66 is interposed between each pair of adjoining driven rollers 60 so as to fill the wedge shaped gap defined between the adjoining driven rollers 60. More specifically, the spacer 66 is wedge shaped when viewed from sideways, and is C-shaped when viewed from front (FIG. 9). Thus, the core member 32 is partly surrounded by the spacer 66 in cross sectional view.

A C-shaped spring member 68 retains the spacer 66 onto the sleeve member 36. The C-shaped spring member 68 comprises a substantially linear intermediate part 68 which is fitted into a slit 66A formed in a middle part of the spacer 66 and a pair of leg parts 68B bent from either lateral end of the intermediate part 68 toward the sleeve member 36. The free end 68C of each leg part 68B is bent inwardly in the manner of a hook that engages a recess (hole) 56 formed in the corresponding semi-cylindrical part 42. More specifically, the free ends 68C of the two leg parts 68B engage the recesses 56 of the semi-cylindrical parts 42 of the two different, adjoining sleeve members 36. Owing to the resiliency of the leg parts 68B, the spring member 68 can be attached to and detached from the sleeve members 36 without requiring any special tools.

Figure 10:
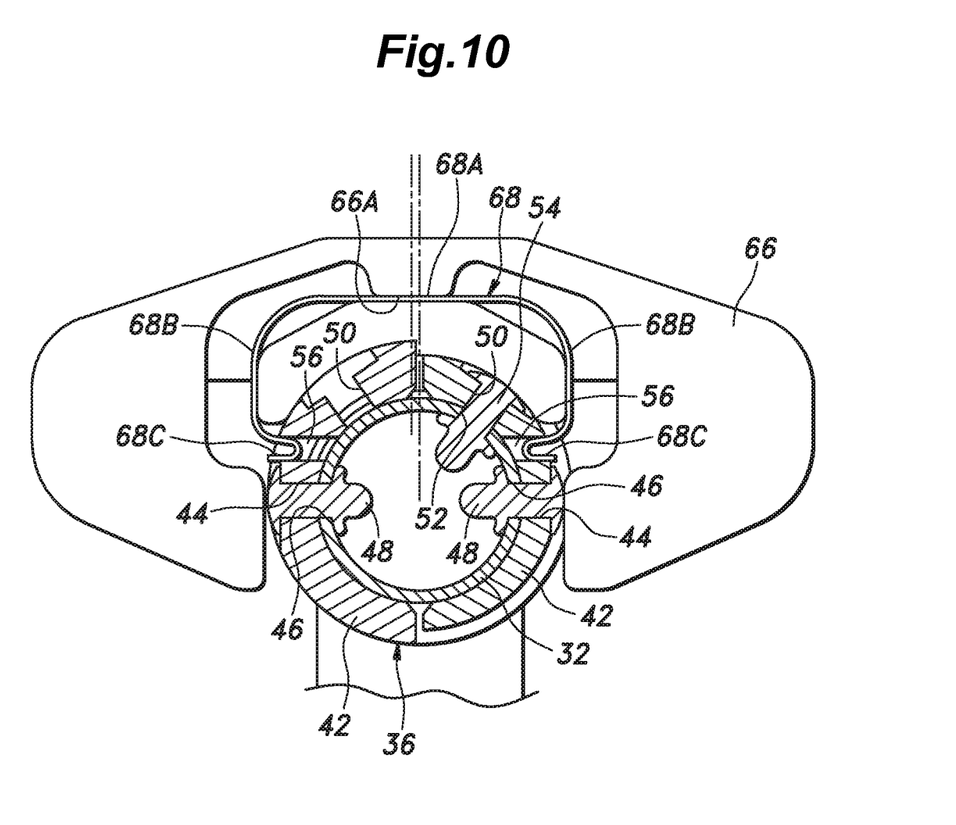
FIG. 10 is a view similar to FIG. 9 showing an modified embodiment of the present invention.

Each free end 68C of the spring members 68 may also be bent back in the shape of letter U as shown in FIG. 10. The entire U-shaped part of the free end 68C is engaged or received in the recess 56.

Thus, according to the illustrated embodiment, the annular core member 32 of the main wheel 30 is formed by combining two semi-circular halves 34 by using the sleeve members 36 for supporting the driven rollers 60 located on each junction A between the two halves 34. Each sleeve member 36 is configured to closely receive the core member 32 in the inner bore 38 thereof. Therefore, the two halves 34 can be joined to each other in a highly stable manner and with a high mechanical strength by using a simple structure and without requiring a special tool.

Each half 34 can be manufactured by bending a metallic pipe member so that the core member 32 can be manufactured at low cost as compared to the case where the core member 32 is manufactured by milling or forging. Furthermore, the use of the pipe members is advantageous in ensuring a high stiffness and a high mechanical strength without unduly increase the weight.

Because the core member 32 is formed by joining the two halves 34, the assembling of the sleeve members 36 and the driven rollers 60 onto the core member 32 is facilitated.

Because the sleeve members 36 each supporting a driven roller 60 are fitted on the annular core member 32 substantially without any gap defined between one another, and each sleeve member 36 is secured to the core member 32 by using the blind rivets 48 and 54, the circumferential movement of the sleeve members 36 can be avoided, and the rattling of the sleeve members 36 or the driven rollers 60 during operation can be avoided. Also, the sleeve members 36 add to the stiffness of the core member 32 so that the deformation of the main wheel 30 under the loading of the rider can be minimized.

The spacers 66 prevent foreign matters from getting into the gaps between the driven rollers 60, and ensure a favorable rotation of the driven rollers 60 even in most adverse environments. Because each spacer 66 can be readily retained and removed by using the corresponding spring member 68 without requiring any special tool, the manufacturing process of the main wheel 30 is simplified, and the servicing of the main wheel 30 is facilitated.

Although the present invention has been described in terms of a preferred embodiment thereof, it is obvious to a person skilled in the art that various alterations and modifications are possible without departing from the scope of the present invention.

For instance, the core member 32 may be formed not only by two halves 34, but also by three thirds, four fourth and so on. If desired, the core member 32 may also consist of a single annular member which is cut only at one location. A gap may be created at this cut part by pulling the adjoining end parts of the core member either circumferentially or in the axial direction away from each other so that the sleeve members may be fitted on the core member from the pulled apart end parts. The core member 32 is not necessarily required to be made of a hollow pipe member, but may also be made of solid annular member. The cross sectional shape of the core member 32 is not limited to be circular, but may also be elliptic or polygonal without departing from the spirit of the present invention. The sleeve members 36 may be secured to the core member 32 by using other fasteners such as screws and clips.

The invention claimed is:

1. An omni-wheel, comprising:
   an annular core member having at least one junction defined by mutually circumferentially opposing ends thereof;
   a plurality of sleeve members defining an inner bore and passed onto the core member; and
   a free roller rotatably supported on an outer surface of each sleeve member in a coaxial relationship;
   wherein the mutually opposing ends of the annular core member at the at least one junction are fitted into either end of the inner bore of a corresponding one of the sleeve members.

2. The omni-wheel according to claim 1, wherein the sleeve members are identically shaped to one another.

3. The omni-wheel according to claim 1, wherein the sleeve members each include a cylindrical part supporting a corresponding said free roller and a pair of semi-cylindrical parts extending from either end of the cylindrical part, the two semi-cylindrical parts being in an angularly offset relationship by 180 degrees about a central axial line thereof so that the two semi-cylindrical parts of each pair of adjoining ones of the sleeve members interlock with each other.

4. The omni-wheel according to claim 3, wherein the sleeve members are each secured to the core member at the semi-cylindrical parts thereof by using fasteners.

5. The omni-wheel according to claim 4, further comprising a spacer interposed between each adjoining pair of the free rollers, the spacer being retained to mutually interlocking semi-cylindrical parts of a corresponding interlocked pair of adjoining ones of the sleeve members by a spring member having an intermediate part engaging the spacer and a pair of leg parts extending from either lateral end of the intermediate part and resiliently retained in engagement features provided in the semi-cylindrical parts, respectively, at free ends thereof.

6. The omni-wheel according to claim 1, wherein the core member comprises a metallic pipe member.

7. The omni-wheel according to claim 1, wherein the core member comprises a pair of semi-circular halves joined into a fully circular configuration at a pair of the junctions.

8. A frictional propulsion device, comprising:
   a pair of drive disks rotatably supported by a unit frame about a common rotational center line opposite to each other, each drive disk including a plurality of free rollers each rotatably supported thereon about a rotational center line extending obliquely with respect to both a tangential line and the rotational center line of the drive disk; and
   the omni-wheel according to claim 1 positioned between the drive disks, at least part of the free rollers of the omni-wheel being engaged by corresponding ones of the free rollers of the drive disks.

9. An omni-directional vehicle, comprising:
   the frictional propulsion device according to claim 8; and
   a pair of electric motors supported by the unit frame and configured to rotationally drive the two drive disks individually.

* * * * *